United States Patent
Stevenson et al.

(10) Patent No.: US 7,766,790 B2
(45) Date of Patent: Aug. 3, 2010

(54) SELECTABLE ONE-WAY CLUTCH

(75) Inventors: Paul D. Stevenson, Ann Arbor, MI (US); Paula J. Armstrong, Canton, MI (US); Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 562 days.

(21) Appl. No.: 11/685,731

(22) Filed: Mar. 13, 2007

(65) Prior Publication Data

US 2008/0223681 A1    Sep. 18, 2008

(51) Int. Cl.
*B60W 10/08* (2006.01)
*B60W 10/02* (2006.01)
*B60W 10/04* (2006.01)
*H02P 15/00* (2006.01)
*F16D 11/06* (2006.01)
*F16D 13/04* (2006.01)
*F16D 23/00* (2006.01)
*F16D 43/00* (2006.01)
*F16D 15/00* (2006.01)
*F16D 41/06* (2006.01)

(52) U.S. Cl. .................. 477/8; 477/5; 477/6; 192/43.1; 192/45.1; 903/946

(58) Field of Classification Search ............. 477/5, 477/6, 8; 192/41 R, 43, 45.1, 41 A, 43.1; 903/946
See application file for complete search history.

(56) References Cited

U.S. PATENT DOCUMENTS

| | | | |
|---|---|---|---|
| 6,019,699 A * | 2/2000 | Hoshiya et al. ............ 477/20 |
| 6,290,044 B1 * | 9/2001 | Burgman et al. ............. 192/46 |
| 6,719,109 B1 * | 4/2004 | Li et al. .................... 192/3.52 |
| 6,834,750 B2 * | 12/2004 | Baker et al. .................. 192/44 |
| 6,931,956 B2 * | 8/2005 | Thery ......................... 74/325 |
| 7,415,905 B2 * | 8/2008 | Maguire et al. .............. 74/339 |
| 7,491,151 B2 * | 2/2009 | Maguire et al. ............ 477/107 |
| 2008/0169165 A1 * | 7/2008 | Samie et al. ................. 192/43 |
| 2009/0084653 A1 * | 4/2009 | Holmes ................... 192/41 A |

FOREIGN PATENT DOCUMENTS

JP    2002340137 A   * 11/2002

* cited by examiner

*Primary Examiner*—Tisha D Lewis
(74) *Attorney, Agent, or Firm*—Quinn Law Group, PLLC

(57) ABSTRACT

A controllable selectable one-way clutch is provided for use within a hybrid transmission. The clutch comprises an outer and inner race, and a first and second selector plate. A transmission motor controller synchronizes the speeds of the races to facilitate application and release of the clutch, and a transmission controller communicates a signal to the clutch for re-positioning of the plates to apply and release the clutch. The clutch has three operational modes, including freewheeling and holding torque in one direction or both directions. A method is also provided for applying a selectable one-way clutch in a vehicle having a hybrid transmission with a motor controller and a transmission controller, including synchronizing the clutch speed using the motor controller, detecting the direction of the race speed difference, communicating the race speed difference to the transmission controller, and selecting between the clutch operational modes in response to the detected speed difference.

11 Claims, 4 Drawing Sheets

FIG. 2A
| MODE | TORQUE-HOLDING |
|---|---|
| 1 | NONE |
| 2 | ONE DIRECTION |
| 3 | TWO DIRECTION |
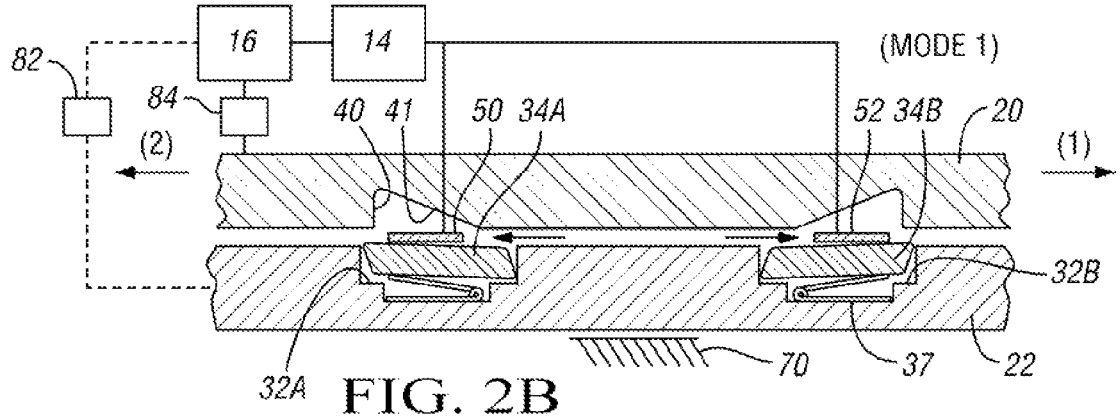
FIG. 2B
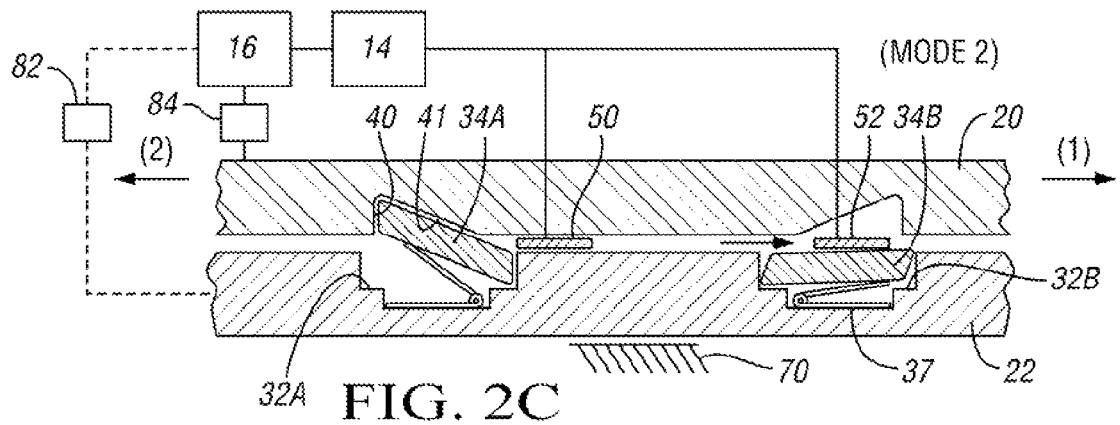
FIG. 2C
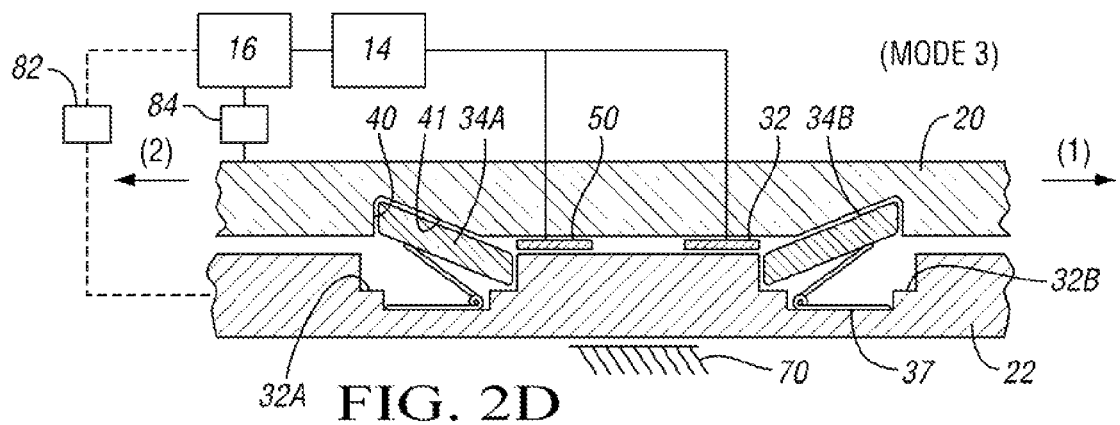
FIG. 2D

SELECTABLE ONE-WAY CLUTCH

TECHNICAL FIELD

The present invention relates generally to the control of a selectable one-way clutch, and in particular to a selectable one-way clutch having three operational modes for use within a hybrid transmission having a motor controller and a transmission controller, wherein clutch speed synchronization is controlled by the motor controller and clutch actuation and release are controlled by the transmission controller.

BACKGROUND OF THE INVENTION

In a vehicle having a gasoline/electric hybrid transmission, the vehicle may be powered alternately by a gasoline-powered internal combustion engine or an electric motor to thereby optimize fuel efficiency while reducing vehicle emissions. Hybrid vehicles achieve their relatively high fuel efficiency in large part by alternating between the gasoline-powered engine and the electric motor when one power source is better suited than the other for a specific vehicle operating condition. For example, a gasoline-powered engine is known to be more efficient than an electric motor during periods of constant or relatively non-variable vehicle speed, such as while cruising at a sustained rate of speed, while an electric motor is generally better suited than a gasoline engine for use when the vehicle power requirements are highly variable, such as during starting or stopping of the vehicle.

Vehicles having either conventional internal combustion or hybrid gasoline/electric transmissions typically utilize a torque-transmitting device known as a friction clutch or clutch pack for smoothly engaging or coupling two rotating bodies or shafts to transmit torque therebetween. Likewise, the same clutch pack is used to subsequently disengage the coupled shafts to interrupt the power transfer and permit, for example, a smooth shifting between the various gears of a planetary gear set and/or decoupling of one or more motor/generators. Hybrid vehicles in particular generally shift gears in a more controlled and synchronous manner relative to conventional gas engines, due in part to the unique configuration and integrated hybrid motor and transmission controls. However, even within the more synchronous shifting mechanism of a hybrid transmission, conventional clutch packs tend to require a higher hydraulic pump pressure to quickly and fully actuate the conventional clutch-apply mechanism, which may in turn lead to higher losses within the hydraulic circuit and/or spin losses at or along the clutch plate interface.

SUMMARY OF THE INVENTION

Accordingly, a hybrid gasoline/electric transmission having a motor controller and a transmission controller is provided comprising a controllable three-mode, selectable one-way clutch with an outer race, an inner race, a pair of actuators, and two selector plates that are slidingly engageable within the outer race, the transmission controller being configured to select between the three operating modes and the motor controller being configured to synchronize the clutch speed to facilitate mode selection.

In one aspect of the invention, the three operational modes comprise freewheeling in two clutch rotational directions, torque holding in one rotational direction, and torque holding in two rotational directions.

In another aspect of the invention, a method is provided for controlling a selectable one-way clutch within a hybrid transmission having a motor controller and a transmission controller. The method includes detecting the speed difference across the selectable one-way clutch using a speed sensor, communicating the detected speed difference from the speed sensor to the transmission controller, synchronizing the clutch speed using the motor controller, and selecting between one of three clutch operational modes in response to a speed difference signal from the transmission controller.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a table describing three clutch operational modes according to the invention;

FIG. 2B is a schematic fragmentary cross sectional side view of an outer and inner race of a controllable, selectable one-way clutch having two selector plates showing a first operational mode according to the invention;

FIG. 2C is a schematic fragmentary cross sectional side view of an outer and inner race of a controllable, selectable one-way clutch having two selector plates showing a second operational mode according to the invention;

FIG. 2D is a schematic fragmentary cross sectional view of an outer and inner race of a controllable, selectable one-way clutch having two selector plates showing a third operational mode according to the invention;

DESCRIPTION OF THE PREFERRED EMBODIMENTS

Figure 1A:
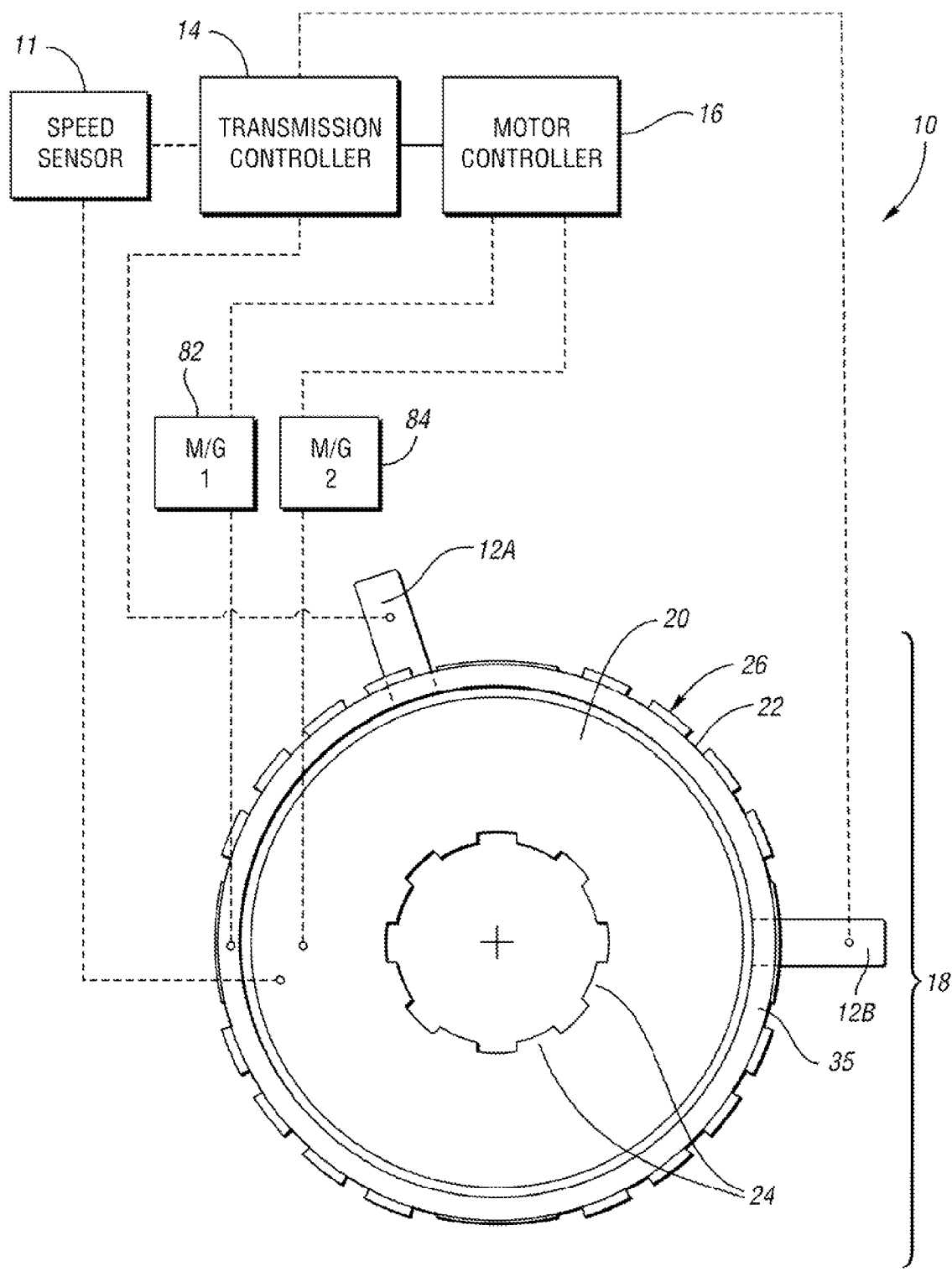
FIG. 1A is a schematic plan view of a controllable, selectable one-way clutch having three operational modes according to the invention.

Referring to the drawings wherein like reference numbers correspond to like or similar components throughout the several figures, there is shown in FIG. 1A a portion of a hybrid transmission 10 having a controllable, selectable one-way clutch 18, hereinafter referred to as clutch 18. Clutch 18 is preferably a mechanical diode-type selectable one-way clutch, but may also take the form of, for example, a sprag clutch, roller clutch, or other selectable one-way clutch. Clutch 18 has mating concentric inner and outer races 20, 22, respectively. As shown in FIG. 1C, inner race 20 has an outer wall 39, a plurality of angled wells 36 as will be described later hereinbelow, and a plurality of radially-inward projecting teeth or splines 24 that are configured to engage or mate with slots or grooves of a rotatable body, such as a drive or crank shaft (not shown). Likewise, as shown in FIG. 1A, outer race 22 has an outer wall 35 having a plurality of outwardly-projecting teeth or splines 26 that are configured to mate with slots or grooves of a preferably stationary or grounded clutch hub (not shown).

Hybrid transmission 10 has a speed sensor 11, a motor controller 16, and a transmission controller 14. Speed sensor 11 is preferably an input/output-type speed sensor of the type known in the art, and is configured to deliver a speed sensor signal to the transmission controller 14. The motor controller 16 is configured to control the operation of at least one and preferably two motor/generators 82, 84, labeled M/G 1 and M/G 2, respectively, as well as to synchronize the rotational speeds of the inner and outer races 20, 22, as described later herein. The transmission controller 14 is configured to control the operation and/or functionality of the non-motor components of the hybrid transmission 10, and is configured to receive a signal from the speed sensor 11 for actuation (i.e. apply and release) of the clutch 18. A first and second projection or arm 12A and 12B are each operatively and respectively connected to a first and second selector plate 50, 52 of the clutch 18, with each selector plate 50, 52 shown in more detail in FIG. 1B.

Figure 1B:
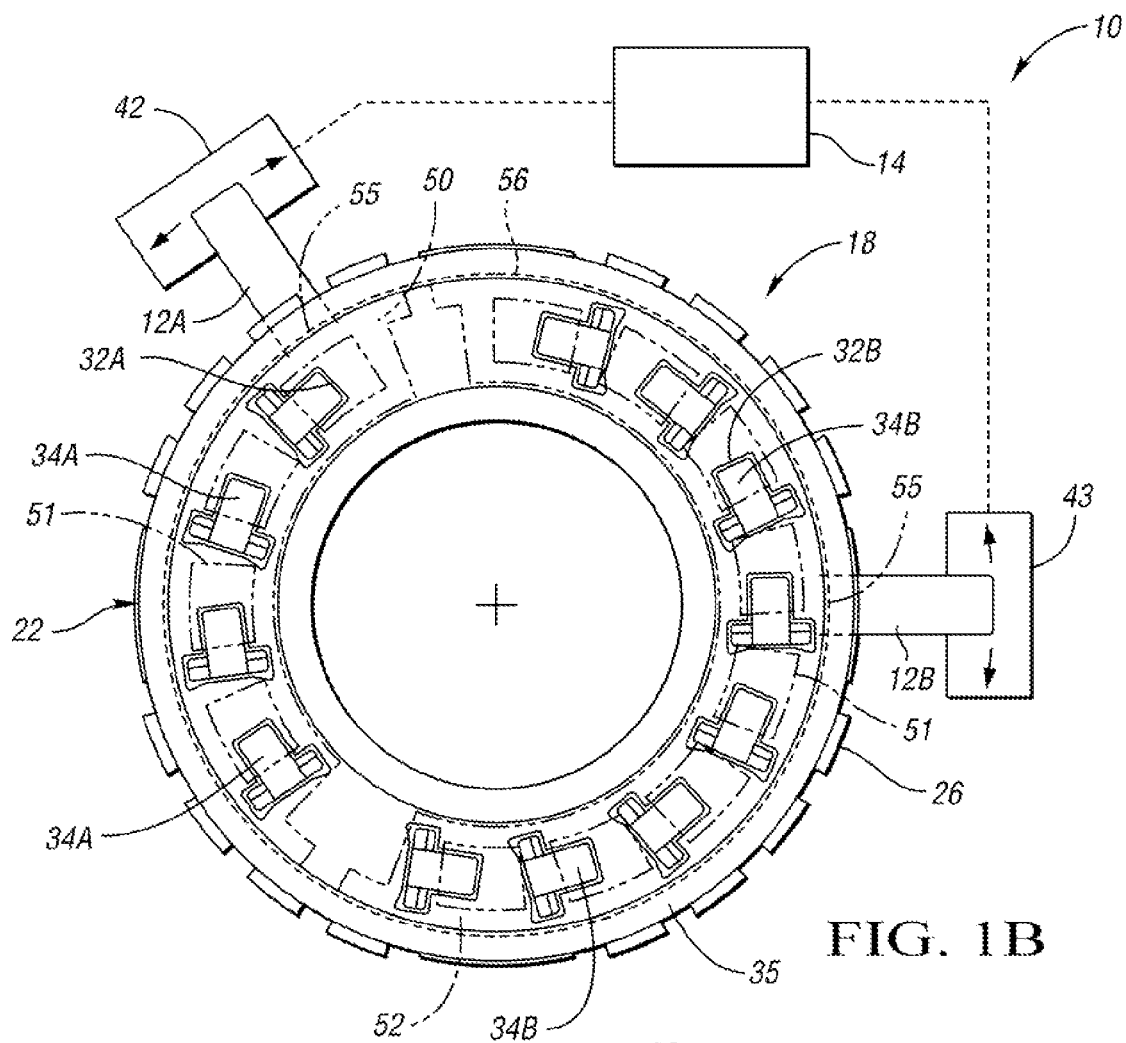
FIG. 1B is a schematic plan view of an outer race and dual-selector plates of a controllable, selectable one-way clutch according to the invention.
Figure 1C:
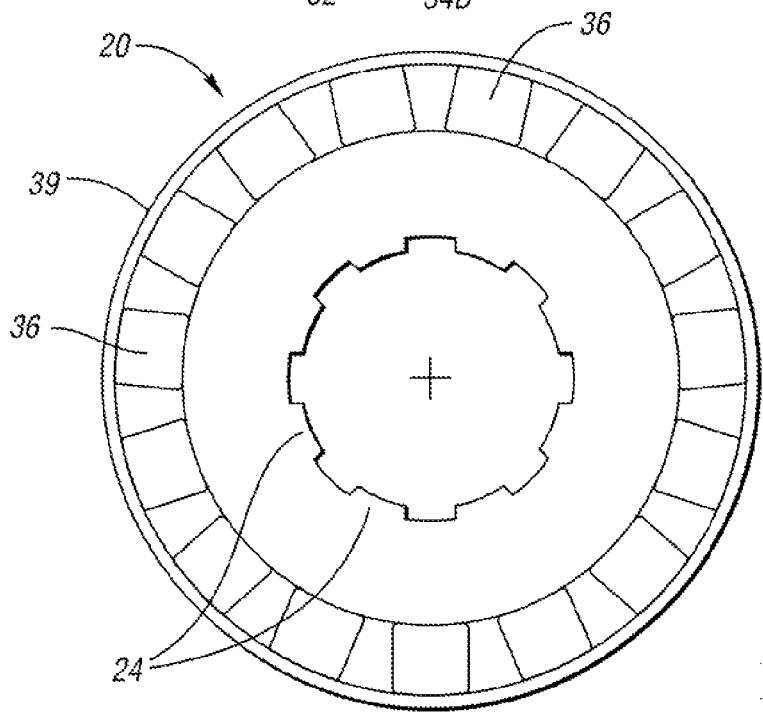
FIG. 1C is a schematic plan view of an inner race of a controllable, selectable one-way clutch according to the invention.

FIG. 1B, which is a plan view depicting clutch 18 with inner race 20 removed to show the internal detail of clutch 18, shows the outer race 22 with a preferably continuous circumferential groove 56 that is sized and shaped to guide or direct selector plates 50, 52, each of which are at least partially slidably moveable or repositionable within the groove 56. Selector plates 50, 52 each have a plurality of preferably identical and equally spaced openings or windows 51. Also, a plurality of substantially identical strut wells or pockets 32A, 32B are arranged around the outer wall 35 of outer race 22, preferably with approximately equal spacing within each set of pockets. Pockets 32A and 32B are substantially identical, preferably differing only in orientation to facilitate actuation of clutch 18. Specifically, each of pockets 32A are preferably oriented in one direction, while each of pockets 32B are preferably oriented approximately 180° opposite the orientation of pockets 32A.

Additionally, each of the pockets 32A, 32B are configured and sized to receive a mating strut 34A, 34B, with each strut 34A, 34B being configured and/or shaped to engage and/or disengage with an angled well 36 (see FIG. 1C) or similar recess within the inner race 20 as required to respectively allow rotation of the inner race 20 in either one or both directions, as well as to lock or hold torque in both directions. First and second arms 12A, 12B are operatively attached to the first and second selector plates 50, 52, respectively, providing a projection on which a force external to the outer race 22 may be exerted or directed for moving the selector plates 50, 52 to bring the windows 51 into engagement with the struts 34A, 34B, alternately depressing and releasing the struts 34A, 34B as needed. When actuated by arms 12A, 12B, respectively, the selector plates 50, 52 each slide or move along the circumferential groove 56 of outer race 22, with each of the arms 12A, 12B protruding through an opening or slot 55 in outer wall 35. The first arm 12A is actuated by a first actuator 42. Likewise, the second selector plate is actuated by a second actuator 43, with the motion of the arms 12A, 12B represented by the arrows in FIG. 1B. The actuators 42, 43 are controlled by the transmission controller 14 and are preferably slide valves of the type known in the art. However, those skilled in the art will recognize that any mechanism suitable for repositioning first and second selector plates 50, 52 respectively, along or within circumferential groove 56 may be used, such as, for example, a piston or motor.

Turning to the table of FIG. 2A, three operational modes are shown for clutch 18 (see FIGS. 1A-C), with each clutch operational mode defining the direction of torque holding within the clutch 18. In Mode 1 the clutch 18 is allowed to "freewheel", i.e. torque is not held in either rotational direction, and permitting for example inner race 20 to rotate or spin unimpeded within a stationary outer race 22. In Mode 2, torque is locked or held in one rotational direction. For example, inner race 20 would be permitted to freewheel or rotate unimpeded in a clockwise direction, and lock or be held from rotating in the counter-clockwise direction. Finally, in Mode 3 the clutch 18 is locked, i.e. torque is held in both rotational directions. Each of the three operational modes described generally above as applied to clutch 18 are shown in detail in the fragmentary cross-sectional side views of FIGS. 2B, 2C, and 2D, respectively.

In each of FIGS. 2B, 2C, and 2D, wells 32A, 32B are shown with a substantially vertical locking surface 40 and a sloped surface 41. Vertical locking surface 40 is configured and/or shaped to oppose a strut 34A, 34B to thereby prevent rotation in one direction when Modes 2 or 3 are selected (see FIG. 2A), while sloped surface 41 is configured and/or shaped to allow a strut 34A, 34B to be depressed into a mating pocket 32A, 32B as required and thereby permits relative rotation of the races 20, 22 in at least one direction, i.e. Modes 1 or 2 (see FIG. 2A). As shown in FIGS. 2B, 2C, and 2D, outer race 22 is grounded to the transmission case 70 and inner race 20 is rotating, inner race 20 being connected to motor/generator 84, which is in communication with the motor controller 16. Motor controller 16, as previously described, is configured to synchronize the rotational speeds of the inner and outer races 20, 22 to facilitate actuation of the clutch 18. However, in the event outer race 22 is not grounded and therefore is also rotating, the motor/generator 82 would be likewise connected to the outer race 22 and in communication with motor controller 16, as shown by the dotted line connection.

In FIG. 2B, representing Mode 1 or "freewheeling", first and second selection plates 50, 52 are positioned by actuators 42, 43, respectively, in response to a control signal from the transmission controller 14. When repositioned as shown, first and second selector plates 50, 52 depress each of the required number of struts 34A, 34B into a respective mating well 32A, 32B, with each strut 34A, 34B compressing a biasing spring 37 to thereby allow inner race 20 to freely rotate or freewheel in either rotational direction, as represented by arrows 1 and 2. Likewise, in FIG. 2C, representing Mode 2 or torque-holding in a single direction, the first selector plate 50 is positioned in response to a signal from the transmission controller 14. Biasing springs 37 return any depressed strut 34A to its initial position, thus engaging the strut 34A with a vertical locking surface 40. Torque is held in one direction by preventing the inner race 20 from rotating in the direction of arrow 1 due to the obstructing presence of the strut 34A. The second selector plate 52 continues to depress strut 34B, allowing inner race 20 to continue to freely rotate in the direction of arrow 2. Finally, in FIG. 2D both first and second selector plates 50, 52 are repositioned to allow biasing springs 37 to uncompress and return struts 34A, 34B to their initial, non-depressed state, thereby locking the inner race 20 in both rotational directions (arrows 1 and 2). While a single strut 34A, 34B is shown in FIGS. 2B, 2C, and 2D for illustrative simplicity, for optimal control and performance of clutch 18, a plurality of struts 34A, 34B is preferred, such as shown in FIG. 1B.

Figure 3A:
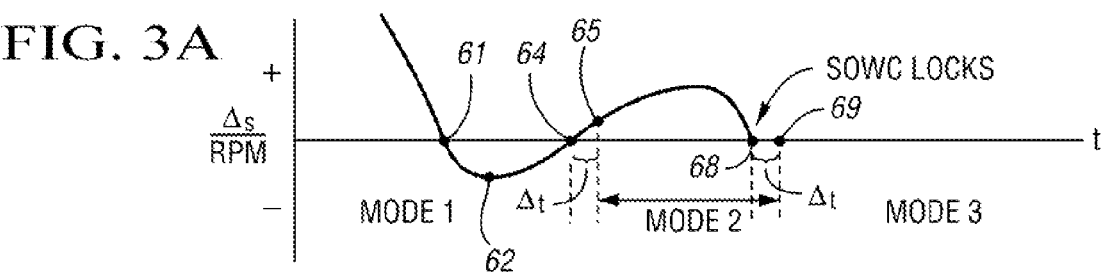
FIG. 3A is a graphical illustration of differential clutch speed versus three clutch operating modes during application of a selectable one-way clutch according to the invention.

Turning to FIG. 3A, a curve is shown plotting differential clutch speed ($\Delta_S$) versus the three clutch operating modes (see FIG. 2A) during application of clutch 18 (see FIGS. 1A, 1B, and 1C). The three operational modes are arranged sequentially along the X axis, while the Y axis describes the speed differential $\Delta_S$ as measured across the disparately rotating inner and outer races 20, 22 (see FIGS. 1A, 1B, and 1C). According to the invention, each of the three operational modes, i.e. Mode 1, Mode 2, and Mode 3, are selected from according to a measured or otherwise determined speed differential $\Delta_S$ determined by speed sensor 11 (see FIG. 1A), with $\Delta_S$ also having a positive or negative rotational direction value defined by the relative rotational direction of the inner and outer races 20, 22.

As shown in FIG. 3A, while in Mode 1, i.e. "freewheeling", to apply the clutch 18 the motor controller 16 (see FIGS. 2A, 2B, and 2C) cycles or synchronizes the outer and inner races 20, 22 of the clutch 18 so that $\Delta_S$ approaches approximately zero revolution per minute, as represented by point 61. The signal communicated at point 61 precipitates a change from Mode 1 to Mode 2 when the speed sensor 11 detects that the direction of $\Delta_S$ reaches a non-negative quantity, i.e. at point 64, at which point the transmission controller 14 signals the clutch 18 to change to Mode 2 and thereby hold torque in one rotational direction. Because of the time delay in making the physical shift by actuation of the required selector plates 50, 52 (see FIG. 2C), a slight time lag $\Delta t$ occurs before Mode 2 is fully realized at point 65. While the direction of $\Delta_S$ is positive, the clutch 18 continues freewheeling. While in Mode 2, when the direction of $\Delta_S$ turns negative, i.e. at point 68, the clutch 18 locks. When the speed sensor 11 detects zero differential clutch speed and zero speed change, the transmission controller 14 signals the clutch 18 to change to Mode 3 so that rotational motion is prevented in both directions, as shown in FIG. 2D, thereby freeing or releasing the motor/generators 82, 84 (see FIG. 1A) to change speeds as necessary. Because of the time delay in making the physical shift by actuation of the required selector plates 50, 52 (see FIG. 2D), a slight time lag $\Delta t$ occurs before Mode 3 is fully realized at point 69.

Figure 3B:
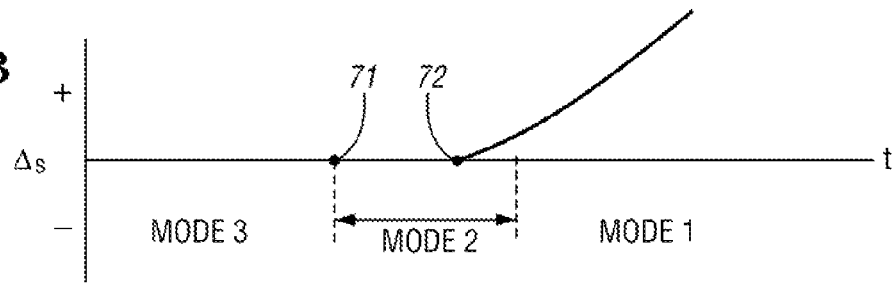
FIG. 3B is a graphical illustration of differential clutch speed versus three clutch operating modes during release of a controllable, selectable one-way clutch according to the invention.

Turning to FIG. 3B, a similar speed curve is shown describing the release of the clutch 18, beginning with dual-directional torque holding or Mode 3. To initiate the release of the clutch 18, the transmission controller 14 (see FIGS. 1A and 1B) commands or signals a mode change from Mode 3 to Mode 2 at point 71. Prior to a mode change to Mode 2, the motor controller 16 commands or signals the motor to load the clutch 18 in the direction opposite that of the impending clutch release, then in Mode 2 the motor controller 16 unloads the clutch 18 so that the clutch 18 may be easily released (i.e. the struts 34B may be more easily disengaged in FIG. 2C) in the opposite direction. When the speed sensor 11 (see FIG. 1A) detects that the quantity $\Delta_S$ is positive, the transmission controller 14 changes the operating mode to "freewheel in both directions", i.e. Mode 1, which is the initial state of FIG. 3A as previously described hereinabove. The actuation cycle then repeats as previously described hereinabove for FIG. 3A.

Figure 4A:
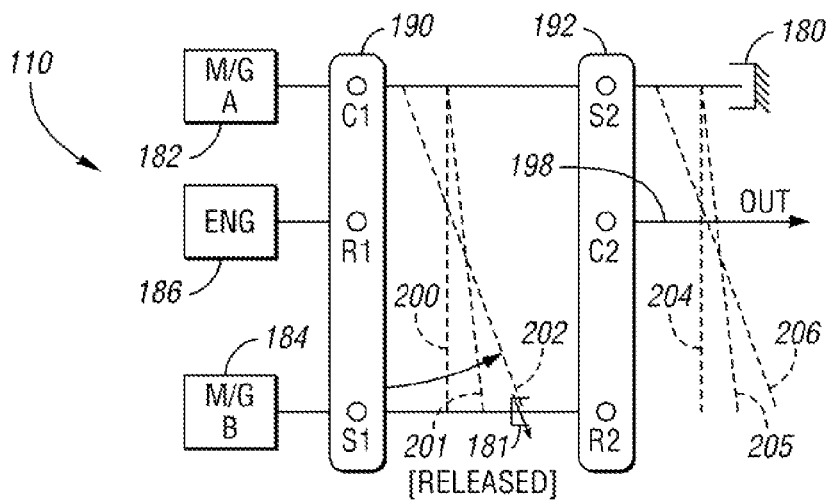
FIG. 4A is a lever diagram of a representative hybrid transmission having a controllable, selectable one-way clutch in "released" mode.

Turning now to FIG. 4A, a lever diagram is shown for a representative hybrid transmission 110 having a selectable one-way clutch 180 as previously described herewithin for clutch 18, the clutch 180 shown in a released or unapplied state (i.e. Mode 1). The hybrid transmission 110 has a first and second motor/generator, 182, 184, respectively, an engine 186, and a first and second planetary gear set 190, 192, respectively. The first and second motor/generators 182 and 184 are controlled by a motor controller 16 (see FIGS. 1A and 2A-D) as previously described hereinabove. First planetary gear set 190 comprises a carrier (node C1), a ring gear (node R1), and a sun gear (node S1). Likewise, second planetary gear set 192 comprises a carrier (node C2), a ring gear (node R2), and a sun gear (node S2). A second clutch 181, which may allow for different gear connections, is shown in an applied state. First motor/generator 182 is operatively connected to carrier C1 of first planetary gear set 190, which is in turn connected to the sun gear S2 of the secondary planetary gear set 192. Second motor/generator 184 is connected to the sun gear S1, which is in turn connected to the ring gear R2 through the second applied clutch 181. Engine 186 is connected to the ring gear R1, while the carrier C2 is connected to the clutch output 198. Clutch 180 of the present invention is shown in the disengaged or unapplied state.

Figure 4B:
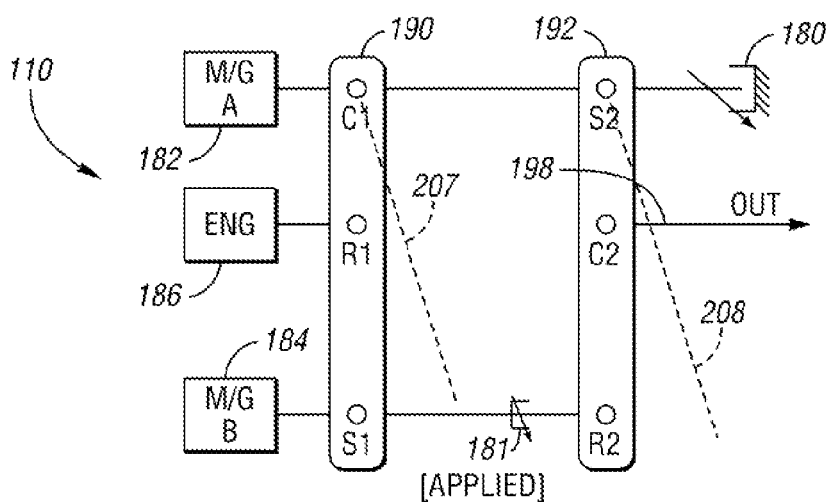
FIG. 4B is a lever diagram of a representative hybrid transmission having a controllable, selectable one-way clutch in "applied" mode.

Dotted lines 200, 201, 202 and 204, 205, and 206 represent various speed ratios in the unapplied mode, i.e. a range of speed ratios determined by motor/generator 182. When clutch 180 is applied as previously described hereinabove, motor/generator 182 cycles or synchronizes the speed across clutch 180 to approximately zero rpm to provide a single fixed speed ratio, as represented by dotted lines 207 and 208. As shown in FIG. 4B, torque is held in both directions, i.e. clutch 180 is fully applied. While the hybrid transmission 110 shown in FIGS. 4A and 4B is one example, those skilled in the art will recognize that various other hybrid transmission configurations and designs would be operable within the scope of the invention.

While the best modes for carrying out the invention have been described in detail, those familiar with the art to which this invention relates will recognize various alternative designs and embodiments for practicing the invention within the scope of the appended claims.

The invention claimed is:

1. A hybrid transmission comprising:
a controllable and selectable one-way clutch comprising an outer race having a continuous circumferential groove, an inner race, and a first and second selector plate, wherein said selector plates are slidably positionable within said groove of said outer race;
a motor/generator;
a speed sensor adapted for detecting a direction of a speed difference between said inner race and said outer race, and for communicating said detected speed difference from said speed sensor to said transmission controller;
a motor controller configured to control said motor/generator, and to synchronize the rotational speeds of said inner race and said outer race to facilitate application and release of said clutch; and
a transmission controller configured to deliver a control signal to said clutch to select between one of three clutch operational modes in response to said speed difference by automatically sliding at least one of said first and said second selector plates within said continuous circumferential groove.

2. The transmission of claim 1, wherein said clutch has a first and second actuator, said first actuator being configured to re-position said first selector plate and said second actuator being configured to re-position said second selector plate, for selecting between said three operational modes.

3. The transmission of claim 2, wherein said clutch has two rotational directions and wherein said three operating modes include a first operating mode comprising freewheeling of said clutch in both of said rotational directions, said second operating mode comprises holding torque in one of said rotational directions, and said third operating mode comprises holding torque in both rotational directions.

4. The transmission of claim 2, wherein said clutch is a mechanical diode clutch and said actuators are selected from the group of sliding valve and piston.

5. A controllable and selectable one-way clutch for use within a hybrid transmission having a speed sensor, a motor controller, and a transmission controller, the clutch comprising:
   an outer race and an inner race that are synchronizable in response to a signal from said motor controller, wherein said outer race defines a continuous circumferential groove, and wherein the speed sensor is operable for detecting the direction of a speed difference between said races;
   a first and a second selector plate that are slidably positionable within said continuous circumferential groove of said outer race;
   wherein the transmission controller is adapted for selecting between one of three clutch operational modes in response to said speed difference by sliding said selector plates within said groove to thereby selectively apply and release the clutch.

6. The clutch of claim 5, wherein the clutch has a pair of actuators configured to selectively re-position a respective one of said first and said second selector plates to thereby select between said three operational modes.

7. The clutch of claim 6, wherein said clutch is operable in two directions, and wherein said three operational modes include freewheeling of said clutch in both directions, holding torque in one direction, and holding torque in both directions.

8. The clutch of claim 6, wherein said clutch is a mechanical diode clutch and said actuators are selected from the group of sliding valve and piston.

9. A method of applying a selectable one-way clutch having two races in a vehicle having a hybrid transmission with a motor controller and a transmission controller, the method including:
   synchronizing the relative speed of said two races using said motor controller, wherein one of said two races has a continuous circumferential groove;
   detecting the direction of the speed difference between said two races using a speed sensor;
   communicating said detected speed difference from said speed sensor to said transmission controller; and
   selecting between one of three clutch operational modes in response to said speed difference;
   wherein said selecting between one of three clutch operational modes includes automatically sliding at least one of a pair of selector plates within said groove.

10. The method of claim 9, wherein said three clutch operational modes include freewheeling of said races in both rotational directions, holding the torque of said races in one rotational direction, and holding the torque of said races in both rotational directions.

11. The method of claim 9, including a pair of actuators and a pair of selector plates, wherein said selecting between said modes comprises communicating a control signal from said transmission controller to said actuators for repositioning of said selector plates.

* * * * *